United States Patent
Liang et al.

(10) Patent No.: US 11,720,261 B2
(45) Date of Patent: Aug. 8, 2023

(54) TRANSFERRING MEMORY SYSTEM DATA TO A HOST SYSTEM

(71) Applicant: Micron Technology, Inc., Boise, ID (US)

(72) Inventors: Qing Liang, Boise, ID (US); Nadav Grosz, Broomfield, CO (US); Jonathan S. Parry, Boise, ID (US); Deping He, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 172 days.

(21) Appl. No.: 16/989,596

(22) Filed: Aug. 10, 2020

(65) Prior Publication Data

US 2022/0043586 A1    Feb. 10, 2022

(51) Int. Cl.
*G06F 3/06*         (2006.01)
(52) U.S. Cl.
CPC .......... *G06F 3/0625* (2013.01); *G06F 3/0623* (2013.01); *G06F 3/0653* (2013.01); *G06F 3/0659* (2013.01); *G06F 3/0679* (2013.01)
(58) Field of Classification Search
CPC .... G06F 3/0625; G06F 3/0623; G06F 3/0653; G06F 3/0659; G06F 3/0679
See application file for complete search history.

(56) References Cited

U.S. PATENT DOCUMENTS

| 2010/0115310 | A1* | 5/2010 | Kubota | G06F 3/0659 |
| | | | | 713/320 |
| 2014/0195837 | A1* | 7/2014 | Park | G06F 1/3287 |
| | | | | 713/323 |
| 2016/0062690 | A1* | 3/2016 | Shin | G06F 1/3287 |
| | | | | 711/103 |
| 2017/0068480 | A1* | 3/2017 | Huang | G06F 1/3275 |
| 2020/0133566 | A1* | 4/2020 | Kim | H04L 9/3247 |
| 2020/0363989 | A1* | 11/2020 | Li | H01L 27/1104 |

\* cited by examiner

*Primary Examiner* — Charles Rones
*Assistant Examiner* — Han V Doan
(74) *Attorney, Agent, or Firm* — Holland & Hart LLP

(57) ABSTRACT

Methods, systems, and devices for transferring memory system data to a host system are described. A system may be configured for transferring information between a memory system and a host system in response to transitions between various operating modes, such as operating modes associated with different operating power levels. For example, before entering a reduced power mode, the memory system may identify information stored in a volatile memory array and transmit the identified information to the host system. Such information transmitted to the host system may be returned to the memory system to support memory system operation after exiting the reduced power mode. In some examples, such information exchanged between the memory system and the host system may be associated with a processing capability of the memory system, and the described operations may be referred to as suspending memory system processing information to a host system.

15 Claims, 7 Drawing Sheets

TRANSFERRING MEMORY SYSTEM DATA TO A HOST SYSTEM

BACKGROUND

The following relates generally to one or more memory systems and more specifically to suspending memory system data to a host system.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
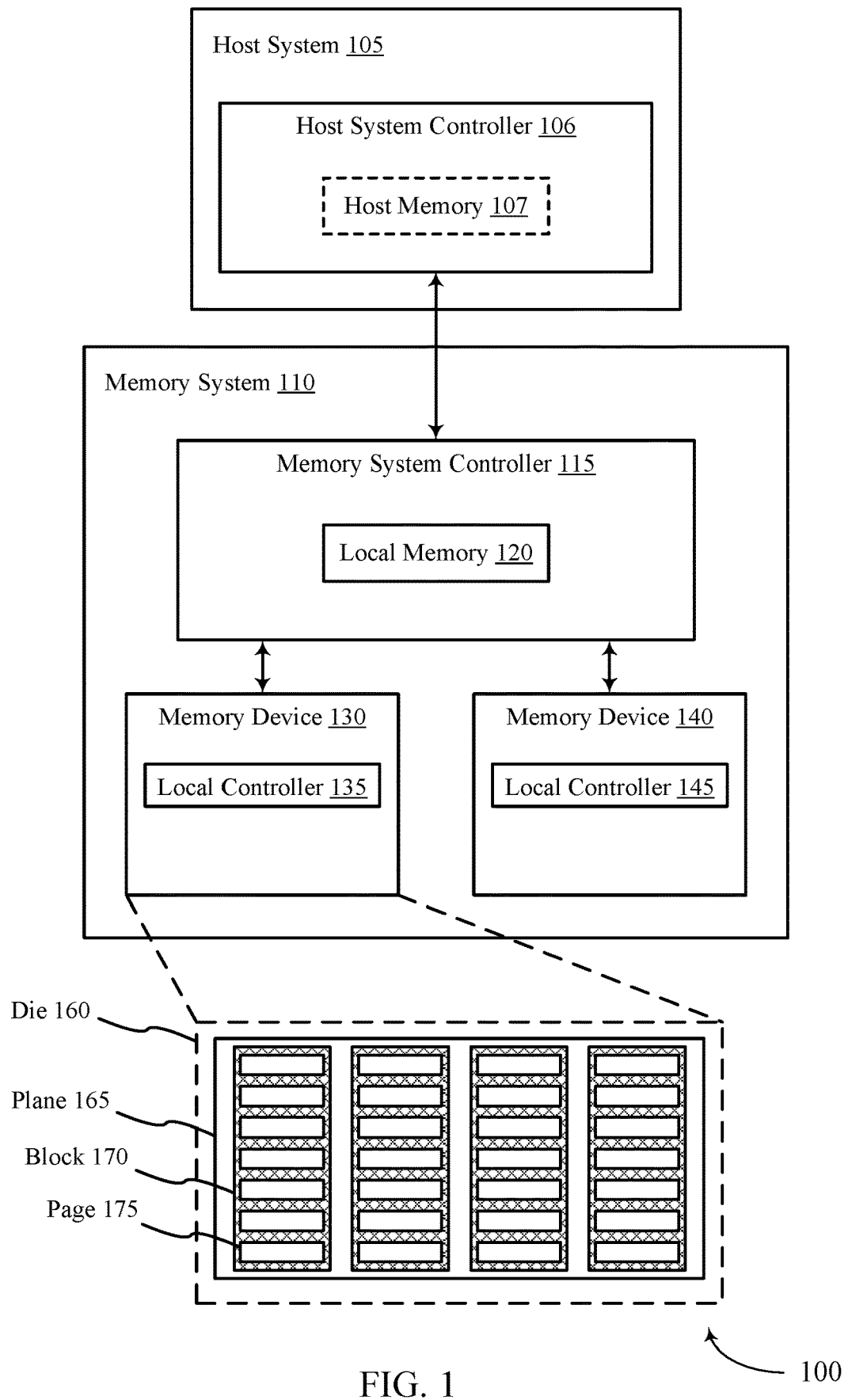
FIG. 1 illustrates an example of a system that supports transferring memory system data to a host system in accordance with examples as disclosed herein.

Some memory systems, including flash memory systems, may include a processing capability, such as an on-board processor, a central processing unit (CPU), an application-specific integrated circuit (ASIC), or other processor, which may be included in the same package as one or more memory arrays of the memory system. Such a processing capability may support various operations at the memory system, for example address mapping or translation, inter-process communication (IPC), array redundancy techniques, caching, wear leveling, and other information management or array management techniques. In some memory systems, a processing capability may be associated with (e.g., supported by) information stored at the memory system, such as firmware tables or cache information, which may involve storing processing information in a memory array of the memory system that is separate from a memory associated with information stored on behalf of (e.g., for access by) a host device.

In some examples, processing information of a memory system (e.g., memory system data) may be stored in a volatile memory array of the memory system, such as a static random access memory (SRAM) array local to or otherwise associated with or accessible by a processor of the memory system. Storage of processing information in a volatile memory array may support relatively low latency and relatively low power consumption during some operating modes. Volatile memory arrays, however, may rely on refresh operations to maintain stored information, and power consumption associated with refresh operations may limit the efficiency of a memory system during reduced power modes, such as idle modes, standby modes, or power-down modes, where the memory system may not be actively performing or otherwise supporting access operations.

In accordance with examples as disclosed herein, a system including a memory system and a host system may be configured for transferring memory system information in response to or otherwise accompanying transitions between various operating modes, such as operating modes associated with different operating power levels. For example, before entering a reduced power mode (e.g., in response to a command from the host system associated with the memory system entering a reduced power mode), the memory system may identify information stored in a volatile memory array and transmit the identified information to be maintained at the host system. Such information transmitted to the host system may be returned to the memory system (e.g., based on a determination for the memory system to exit the reduced power mode) to support memory system operation after exiting the reduced power mode. In some examples, such information exchanged between the memory system and the host system may be associated with a processing capability of the memory system, and the transmission of such information may, in various examples, be referred to as transferring, suspending, or offloading memory system processing information to a host system before or during a power-saving operation. By transmitting such information to a host system, the memory system may be able to reduce or eliminate refresh operations otherwise associated with maintaining such information in a volatile array of the memory system, among other power-down operations, which may reduce power consumption of the memory system during the reduced power mode.

Features of the disclosure are initially described in the context of systems, devices, and associated operations and signaling as described with reference to FIGS. 1 through 3. These and other features of the disclosure are further illustrated by and described with reference to apparatus diagrams and flowcharts that relate to transferring memory system data to a host system as described with reference to FIGS. 4 through 7.

FIG. 1 is an example of a system 100 that supports transferring memory system data to a host system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells, memory cells having a relatively low degree of volatility), and a memory device 140 may include one or more memory arrays of a second type of memory cells (e.g., a type of volatile memory cells, memory cells having a relatively high degree of volatility). The memory device 130, the memory device 140, or a combination thereof, may refer to memory devices having memory arrays configured for storing information exchanged with the host system 105 (e.g., user data exchanged between the memory system 110 and the host system 105, data accessed by the host system 105 by way of a read command, data written on behalf of the host system 105 by way of a write command). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., with the host system controller 106, via the physical host interface), and may be an example of a controller or control component configured to cause the memory system 110 to perform various operations in accordance with examples as described herein.

In some examples, the memory system controller 115 may be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, a CPU, special purpose logic circuitry (e.g., a field programmable gate array (FPGA), an ASIC, a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include SRAM or other memory (e.g., retention memory) that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wearout considerations, for example. In some cases, one or more copies of an L2P mapping table may be stored within the memory cells of the memory device 130 (e.g., within or more blocks 170 or planes 165), or the local memory 120, for use (e.g., reference and updating) by the local controller 135 or memory system controller 115.

In some cases, L2P tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The memory system controller 115 may be a processor of the memory system 110, for example, an example of an embedded or a dedicated processor of the memory system 110 (e.g., a CPU or ASIC of the memory system 110), which may be included in the same package as one or more memory arrays of the memory system 110 (e.g., in a same package or assembly that includes a memory device 130, a memory device 140, or a combination thereof). The memory system controller 115 may support various processing capabilities of the memory system 110, including address mapping or translation, tightly-coupled memory (TCM) techniques, inter-process communication (IPC) techniques, array redundancy techniques, caching, wear leveling, and other information management or array management techniques.

Operation of the memory system controller 115 may be supported by on-board information storage, or storage that is otherwise different than memory devices 130 or memory devices 140, such as a memory array of the local memory 120. For example, during some operating modes (e.g., nominal operating modes, active operating modes), the local memory 120 may be configured to store processing information (e.g., memory system data) such as TCM information, IPC information, redundant array information, cache information, firmware mapping tables, or various combinations thereof.

Implementing the local memory 120 using a volatile memory cell architecture, such as an SRAM architecture, may be associated with relatively low latency during some operating modes of the memory system 110. However, to maintain stored information in a volatile memory array of the local memory 120, the local memory 120 may be configured to perform various periodic refresh operations. In some examples, power consumption associated with refresh operations of the local memory 120 may limit the efficiency of the memory system 110 during reduced power modes, such as idle modes or standby modes, where the memory system 110 may not be actively performing or otherwise supporting access operations (e.g., as commanded by the host device).

In accordance with examples as disclosed herein, the system 100 may be configured for transferring memory system information (e.g., information associated with a processing capability of the memory system 110, information that supports operation of the memory system controller 115, information stored in the local memory 120) between the memory system 110 and the host system 105 in response to or otherwise accompanying transitions between various operating modes, such as operating modes associated with different operating power levels. For example, before entering a reduced power mode of the memory system 110 (e.g., in response to a command from the host system 105), the memory system controller 115 may identify information stored in the local memory 120, and transmit the identified information to the host system 105.

The information transmitted by the memory system 110 may be maintained at or by the host system 105 while the memory system 110 is operating in, or is otherwise idle or standing by in, the reduced power mode. Information may be returned to the memory system 110 (e.g., to the local memory 120) to support operation of the memory system 110 (e.g., of the memory system controller 115) after the memory system 110 exits the reduced power mode, which may be in response to a command from the host system 105 (e.g., associated with the memory system 110 exiting the reduced power mode).

To support maintaining information from the memory system 110 (e.g., from the local memory 120) while the memory system 110 is in a reduced power mode, the host system 105 (e.g., the host system controller 106) may include a host memory 107. In some examples, the host memory 107 may refer to a volatile or non-volatile storage component of the host system 105. The host memory 107 may be configured to store information received from the memory system 110, such as information associated with various processing capabilities of the memory system 110, in response to a transition in operating mode of the memory system 110, among other information and operating conditions.

Although the host memory 107 is shown as being within the illustrative boundary of the host system 105 (e.g., of the host system controller 106), in some examples, the described techniques may be supported by host memory 107 that is outside of, but otherwise accessible to the host system 105, such as another memory device coupled with the host system 105 (e.g., a DRAM or other type of memory device coupled with the host system 105). By maintaining such information at or by a host system 105, the memory system 110 may be able to reduce or eliminate refresh operations of the local memory 120, among other power reduction techniques, which may reduce power consumption of the memory system 110 during the reduced power mode.

The system 100 may include any quantity of non-transitory computer readable media that support transferring memory system data to a host system. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system 110 (e.g., by the memory system controller 115), by a memory device 130 (e.g., by a local controller 135), or by a memory device 140 (e.g., by a local controller 145), may cause the host system 105, memory system 110, memory device 130, or memory device 140 to perform one or more associated functions as described herein.

Figure 2:
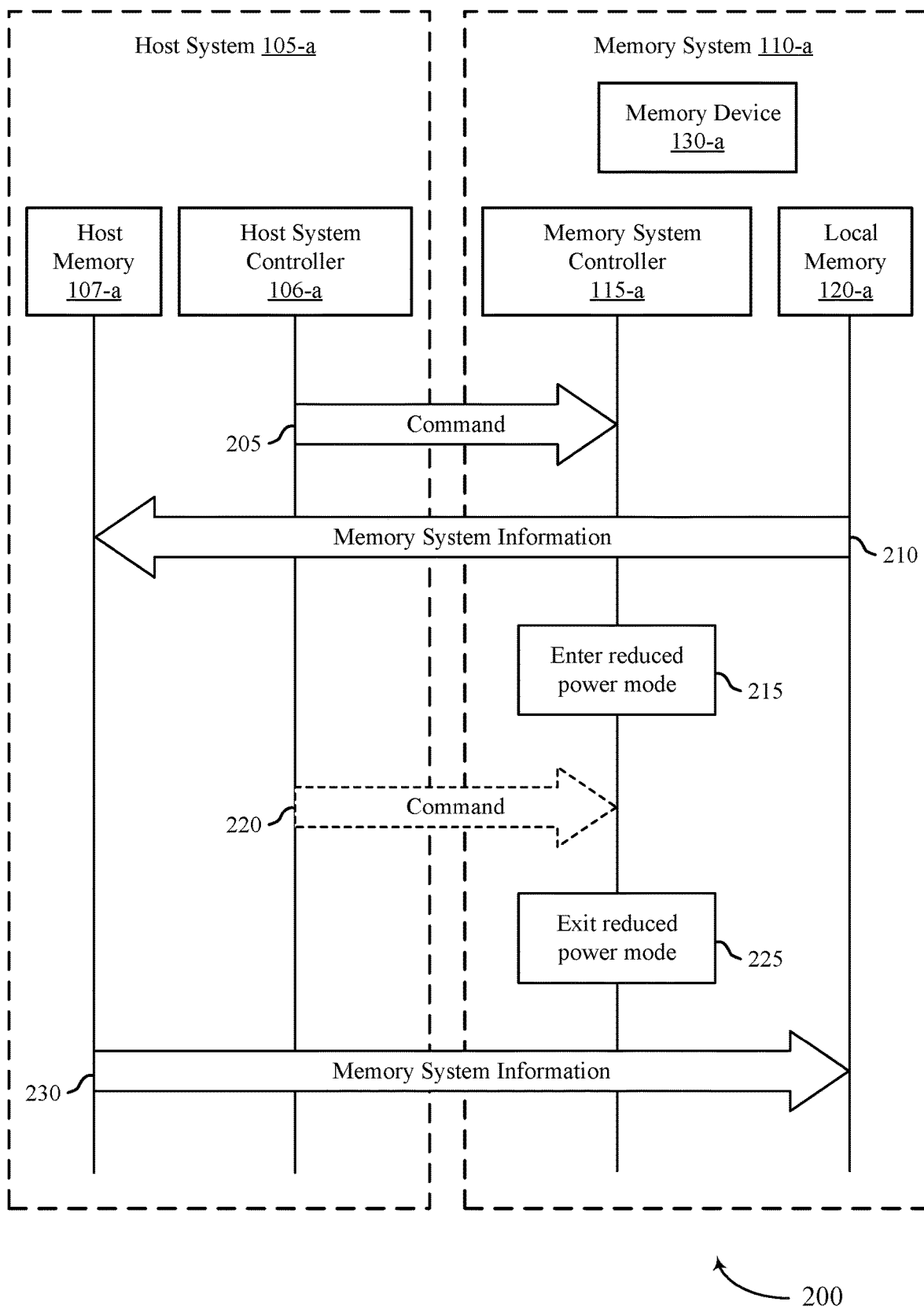
FIG. 2 illustrates an example of a system and associated operations and signaling that support transferring memory system data to a host system in accordance with examples as disclosed herein.

FIG. 2 illustrates an example of a system 200 and associated operations and signaling that support transferring memory system data to a host system in accordance with examples as disclosed herein. The system 200 includes a host system 105-a and a memory system 110-a, which may be examples of the respective systems described with reference to FIG. 1. The host system 105-a and the memory system 110-a may be communicatively coupled via an interface (e.g., a physical host interface), which may include signal-carrying conductors associated with one or more communication channels, operable to convey the described signaling between the host system 105-a and the memory system 110-a.

The memory system 110-a may include a memory system controller 115-a, a local memory 120-a, and a memory device 130-a, which may be examples of the respective components of a memory system 110 described with reference to FIG. 1. Although shown outside the illustrative boundary of the memory system controller 115-a in FIG. 2, in some examples, the local memory 120-a may be considered to be a component of the memory system controller 115-a (e.g., part of a same package). The memory device 130-a may include a memory array associated with a first degree of volatility (e.g., a NAND memory array), and the local memory 120-a may include a memory array associated with a second degree of volatility (e.g., a greater degree of volatility, an SRAM memory array). The memory system controller 115-a may be an example of a controller or control component configured to cause the memory system 110-a to perform various operations in accordance with examples as described herein. Additionally or alternatively, operations performed by the memory system 110-a may be implemented as instructions stored in memory (e.g., firmware stored in a memory coupled with the memory system controller 115-a or the memory system 110-a). For example, the instructions, when executed by a controller (e.g., the memory system controller 115-a), may cause the controller to perform described operations of the memory system 110-a.

The host system 105-a may include a host system controller 106-a and a host memory 107-a, which may be examples of the respective components of a host system 105 described with reference to FIG. 1. The host memory 107-a may include a memory array having volatile memory cells or non-volatile memory cells. Although shown outside the illustrative boundaries of the host system controller 106-a in FIG. 2, in some examples, the host memory 107-a may be a component of the host system controller 106-a, or the host memory 107-a may be a component separate from the host system 105-a but otherwise accessible to the host system controller 106-a (e.g., a memory device external to the host system 105-a). The host system controller 106-a may be an example of a controller or control component configured to cause the host system 105-a to perform various operations in accordance with examples as described herein. Additionally or alternatively, operations performed by the host system 105-a may be implemented as instructions stored in memory (e.g., firmware stored in a memory coupled with the host system controller 106-a or the host system 105-a). For example, the instructions, when executed by a controller (e.g., the host system controller 106-a), may cause the controller to perform described operations of the host system 105-a.

At 205, the host system 105-a may transmit a command (e.g., via the host system controller 106-a) to the memory system 110-a, which may be received via the memory system controller 115-a. The command of 205 may be associated with the memory system 110-a entering a reduced power mode. For example, the command of 205 may be an explicit command for the memory system 110-a to enter the reduced power mode (e.g., a UFS power command, a start/stop unit command), or a different type of command (e.g., an implicit command) that may be otherwise interpreted by the memory system controller 115-a for entering the reduced power mode. In some examples, the command of 205 may be an access command (e.g., a read command, a write command, a refresh command), which the memory system controller 115-a may use to start a timer. In such examples, if the timer reaches a threshold value without the memory system controller 115-a receiving another command, the memory system controller 115-a may initiate operations associated with entering the reduced power mode (e.g., proceeding to 210).

At 210, based at least in part on receiving the command of 205, the memory system 110-a may transmit (e.g., over the interface between the memory system 110-a and the host system 105-a) memory system information stored in the local memory 120-a. The information transfer may be controlled by the memory system controller 115-a, or communicated via the memory system controller 115-a, or both. The information transmitted at 210 may be associated with a processing capability of the memory system 110-a, such as a processing capability of the memory system controller 115-a or another processor of the memory system 110-a. For example, the information transmitted at 210 may include TCM information, IPC information, redundant array information, cache information, a firmware mapping table, or various combinations thereof. In some examples, to provide integrity or confidentiality protection of the memory system information, the memory system 110-a (e.g., the memory system controller 115-a) may be configured to perform an encryption operation or a scrambling operation on the information before the transmitting of 210.

The memory system information transmitted by the memory system 110-a may be received by the host system 105-a and stored in the host memory 107-a. In some examples, such an exchange may be supported by a protocol associated with the interface between the memory system 110-a and the host system 105-a, such as a UFS protocol, or a protocol associated with an interface between the host system controller 106 and the host memory 107. Such operations may leverage existing protocols, which may be modified or configured for the purpose of the information exchange of 210 (e.g., particular to an information exchange between a local memory 120 and a host memory 107). The information may be received via the host system controller 106-a, or the host system controller 106-a may control writing the information to the host memory 107-a, or both. In some examples, in addition to transmitting some information from the local memory 120-a to the host memory 107-a, the memory system 110-a may also maintain some (e.g., different) information in the local memory 120-a. Such techniques may support reducing a proportion of an array of the local memory 120-a that is refreshed, which may provide some power savings compared to when no memory system information is transferred to the host system 105-a. In some examples, all information of the local memory 120-a to be used for later operation may be transferred at 210, so that the local memory 120-a may be fully powered-down (e.g., without refresh operations), which may include identifying information that will be no longer required, and allowing such data to be erased or otherwise lost (e.g., due to lack of refreshing).

At 215, the memory system 110-a may enter a reduced power mode (e.g., after transmitting the memory system information at 210), which may be controlled or otherwise coordinated by the memory system controller 115-a. In various examples, the reduced power mode may refer to a standby mode, an idle mode, a power-down mode, a deep power-down mode, or any other mode that supports a reduced power consumption relative to operations prior to 215 (e.g., normal operations, nominal operations, active operations). In some examples, at 215, the memory system 110-a may enter a power mode that reduces a power consumption associated with operating the local memory 120-a (e.g., disabling or deactivating the local memory 120-a, suppressing refresh operations on the local memory 120-a). Additionally or alternatively, at 215, the memory system 110-a may enter a mode that reduces a power consumption associated with operating the memory device 130 (e.g., disabling or deactivating the memory device 130-a).

In some examples, at 220, the host system 105-a may transmit another command (e.g., via the host system controller 106-a) to the memory system 110-a, which may be received via the memory system controller 115-a. The command of 220 may be associated with the memory system 110-a exiting a reduced power mode. For example, the command of 220 may be an explicit command for the memory system 110-a to exit the reduced power mode or enter an active mode (e.g., a UFS power command, a start/stop unit command), or a different type of command (e.g., an implicit command) that may be otherwise interpreted by the memory system controller 115-a as a command for exiting the reduced power mode (e.g., triggering exiting the reduced power mode). Such a command may be associated with the host system 105-a determining that the memory system 110-a is to exit the reduced power mode. In some examples, the command of 220 may be an access command (e.g., a read command, a write command, a refresh command), which may be associated with the host system 105-a determining to access the memory system 110-a. The memory system controller 115-a may use such an access command to initiate operations associated with exiting the reduced power mode (e.g., proceeding to 225). In some examples, the command of 220 may be omitted, and the memory system 110-a may otherwise initiate or be triggered to exit the reduced power mode (e.g., based at least in part on the memory system 110-a being powered back on).

At 225, the memory system 110-a may exit the reduced power mode (e.g., based at least in part on a command of 220, or other determination or triggering), which may be controlled or otherwise coordinated by the memory system controller 115-a. In various examples, exiting the reduced power mode may refer to transitioning to an active mode, powering up various components or circuitry, enabling or powering the local memory 120-a or the memory device 130-a, or various combinations thereof. In examples where the command of 220 is omitted (e.g., when the memory system 110-a determines to exit the reduced power mode), the memory system 110-a may transmit an indication to the host system 105-a (e.g., that the memory system 110-a is exiting or has exited the reduced power mode) to retrieve the memory system information that was transmitted at 210.

At 230, the host system 105-a may retrieve the memory system information from the host memory 107-a and transmit the information back to the memory system 110-a (e.g., over the interface between the memory system 110-a and the host system 105-a). The information retrieval may be controlled by the host system controller 106-a, or communicated via the host system controller 106-a, or both. The retrieval and transmission may be initiated based on determining to issue a command of 220, or based on receiving an indication from the memory system 110-a, among other techniques. The memory system information transmitted by the host system 105-a may be received by the memory system 110-a and returned to the local memory 120-a.

In some examples, such an exchange may be supported by a protocol associated with an interface between the host system controller 106 and the host memory 107, or a protocol associated with the interface between the memory system 110 and the host system 105. Such operations may leverage protocols, which may be modified or configured for the purpose of the information exchange of 230 (e.g., particular to an information exchange between a host memory 107 and a local memory 120). The information may be received via the memory system controller 115-a (e.g., based at least in part on exiting the reduced power mode at 225), or the memory system controller 115-a may control writing the information to the local memory 120-a, or both. In some examples, the memory system 110-a (e.g., the memory system controller 115-a) may be configured to perform a decryption operation or a descrambling operation on the information after the receiving of 230. Based at least in part on the operations of 230, the memory system 110-a may be restored to normal, nominal, or otherwise active functionality.

Although the operations of 230, associated with returning memory system information to the memory system 110-a, are described as following the exit from a reduced power mode at 225, in some examples, the order of such operations may be reversed. For example, the memory system 110-a may be configured to receive the returned memory system information, or load such information to the local memory 120-a, prior to exiting (e.g., fully) the reduced power mode, or otherwise returning to a normal, nominal, or otherwise active functionality. In such examples, the memory system 110-a may be configured to at least restore refresh operations to the local memory 120-a to support maintaining the memory system information prior to fully exiting the reduced power mode.

Figure 3:
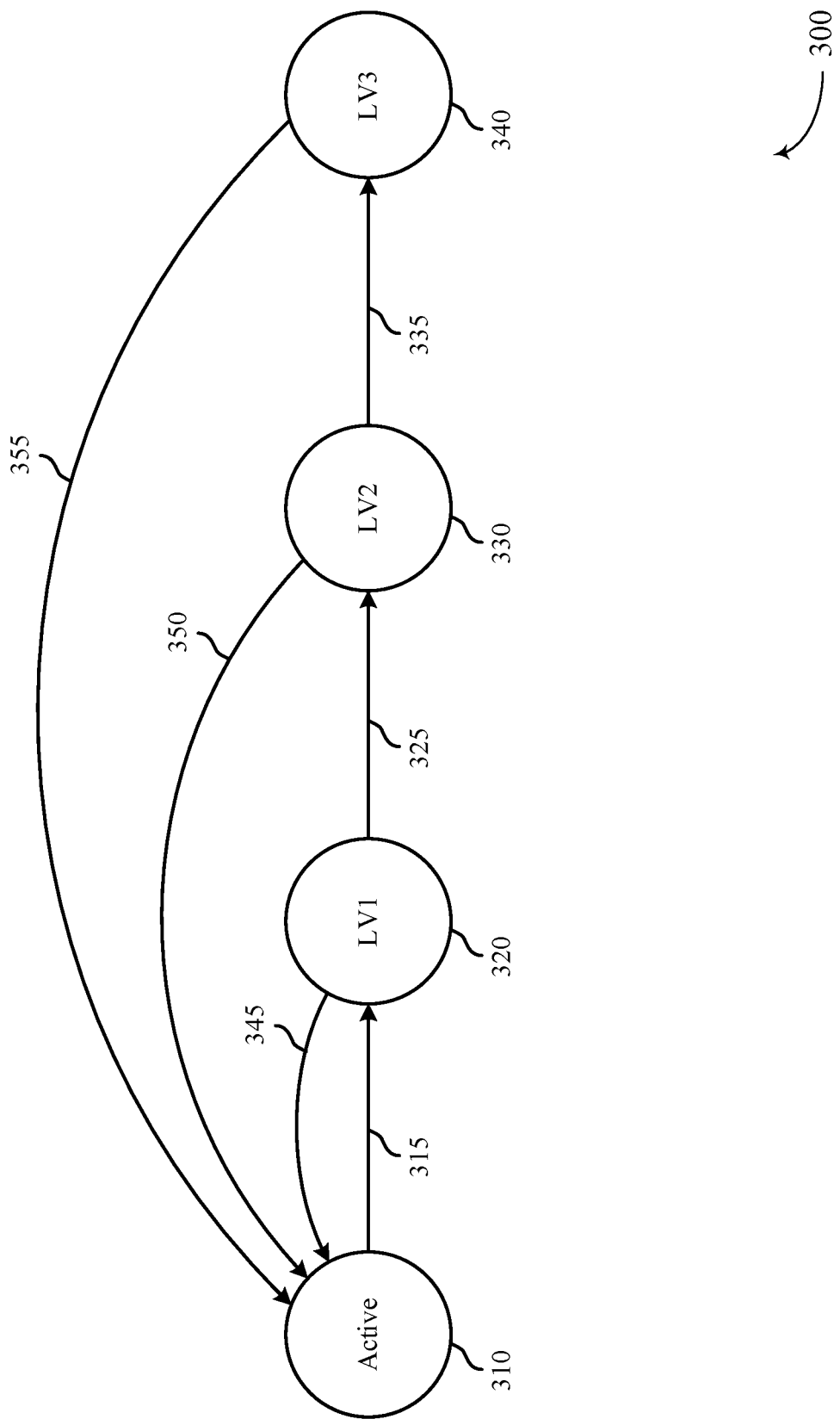
FIG. 3 illustrates an example of a state flow that supports transferring memory system data to a host system in accordance with examples as disclosed herein.

FIG. 3 illustrates an example of a state flow 300 that supports transferring memory system data to a host system in accordance with examples as disclosed herein. The state flow 300 may illustrate operating modes (e.g., power modes) of a memory system 110 as described herein, and transitions between such modes, which may be managed or coordinated by a host system 105 (e.g., a host system controller 106), by a memory system 110 (e.g., a memory system controller 115), or a combination thereof.

State 310 may illustrate an active state, where the memory system 110 is actively performing or otherwise responsive to access commands (e.g., from the host system 105). State 320 may illustrate a first level of reduced power, which may be an idle mode of the memory system 110. State 330 may illustrate a second level of reduced power (e.g., further reduced relative to state 320), which may be a power down mode of the memory system 110. State 340 may illustrate a third level of reduced power (e.g., further reduced relative to state 330), which may be a deep power down mode of the memory system 110.

In some examples, the memory system 110 may operate in the state 310 while actively processing or receiving access commands from the host system 105. Upon completion of a last access command (e.g., while waiting for another access command), the memory system 110 may perform a transition 315 from the state 310 to the state 320 (e.g., an idle mode), where some components or circuitry may be powered down. The memory system 110 may or may not signal or indicate the transition to state 320 to the host device. If the host system 105 transmits another access command, the memory system 110 may perform a transition 345 from the state 320 to the state 310 and return to actively processing or receiving commands.

In some examples, the host system 105 (e.g., a host system controller 106) may include a first timer or counter that tracks a duration since a most recent command transmitted to the memory system 110 (e.g., an idle duration, a duration that the memory system 110 is operating in the state 320). If the first timer or counter satisfies a first threshold (e.g., a threshold idle duration, a static threshold or a dynamic threshold determined by the host system 105 based on various conditions), the host system 105 may transmit a command (e.g., a power-down command) to initiate the memory system 110 performing a transition 325 from the state 320 to the state 330 (e.g., a power-down mode) where components or circuitry may be further powered down. In some examples, the state 330 may be associated with the memory system 110 maintaining memory system information in a local memory 120, and thus, while operating in the state 330, the memory system 110 may perform refresh operations on a memory array of the local memory 120. In some examples, the operations of state 330 may be associated with reducing power to one or more memory devices 130 or 140. While the memory system 110 is operating in the state 330, the host system 105 may, in some cases, transmit a command for the memory system 110 to perform a transition 350 to return to the state 310 (e.g., the active state), which may include an explicit or implicit power-up command, or an access command that the memory system 110 may interpret to initiate the transition 350.

In some examples, the host system 105 (e.g., a host system controller 106) may include a second timer or counter that tracks a duration since a transition 325 (e.g., since a power-down command, a power-down duration, a duration that the memory system 110 is operating in the state 330). If the second timer or counter satisfies a second threshold value (e.g., a threshold power-down duration, a static threshold or a dynamic threshold determined by the host system 105 based on various conditions), the host system 105 may transmit another command (e.g., a deep power-down command) to initiate the memory system 110 performing a transition 335 from the state 330 to the state 340 (e.g., a deep power-down mode) where components or circuitry may be further powered down. For example, the deep power-down mode may be an example of a reduced power mode where a local memory 120-a of the memory system 110 may not be refreshed, or may be partially refreshed. Accordingly, as part of a transition 335, the memory system 110 may transfer memory system information to the host system 105 (e.g., according to the operations of 210 described with reference to FIG. 2). Thus, in some examples, the command to initiate the transition 335 may be an example of the command of 205 described with reference to FIG. 2. While the memory system 110 is operating in the state 340, the host system 105 may transmit a command for the memory system 110 to perform a transition 355 to return to the state 310 (e.g., the active state), which may include an explicit or implicit power-up command, or an access command that the memory system 110 otherwise interprets to initiate the transition 350. In various examples, as part of a transition 355, the host system 105 may return memory system information to the memory system 110 (e.g., according to the operations of 230 described with reference to FIG. 2). Thus, in some examples, the command to initiate the transition 355 may be an example of a command of 220 described with reference to FIG. 2.

In some examples, the exchange of memory system information, such as the operations of 210 or 230 described with reference to FIG. 2, may be associated with power consumption that may limit the aggregate benefit of operating in a reduced power mode. For example, if a duration of operating in a reduced power mode is too short, it may be preferable to refrain from operating in that reduced power mode rather than incurring the power consumption penalty associated with the transition to or from that reduced power mode. Thus, in the context of the state flow 300, the conditions for initiating the transitions 325 and 335 may be configured according to different timing conditions, power conditions, or probabilistic parameters in an effort to manage overall power consumption. In some examples, power consumption or power savings may be dependent on operating temperatures, or other operating conditions (e.g., of a memory system 110, of the host system 105), which may be accounted for in the configuration of transitions 325 or 335. For example, a determination to perform a transition 335 may be based at least in part on an amount of data in a local memory 120 that is to be exchanged during one or both of a transition 335 or a transition 355.

In some examples, at relatively lower temperatures, refresh of a local memory 120 may be associated with relatively lower power consumption, or transfer of memory system information may be associated with relatively higher power consumption. So, to manage overall power consumption at relatively lower temperatures, a transition 335 may be delayed to a relatively longer time after a transition 325 (e.g., remaining in state 330 for a longer duration) at relatively lower temperatures, which may improve the probability that the memory system 110 will be able to remain in the state 340 and maintain an overall power consumption benefit. At relatively higher temperatures, refresh of a local memory 120 may be associated with relatively higher power consumption, or transfer of memory system information may be associated with relatively lower power consumption. So, to manage overall power consumption at relatively higher temperatures, a transition 335 may be performed more quickly at relatively higher temperatures to more quickly reach the benefit of the lower power consumption in the reduced power mode. Thus, according to these and other examples, the transitions 325 or 335 may be based at least in part on an operating temperature, among other operating conditions. In some examples (e.g., based on operating temperature or other operating condition, based on a performance configuration or power configuration, based on an amount of information stored in a local memory 120), the host system 105 may inhibit transitioning to the state 340, and instead maintain the memory system 110 at the state 330 until performing a transition 350. In various examples, these and other related configurations may be based at least in part on a user setting (e.g., a user-selected performance mode, a user-selected power mode), or an observed power condition (e.g., on-battery operation, externally-powered operation, a percentage of battery capacity, a remaining battery run time), among other conditions.

Figure 4:
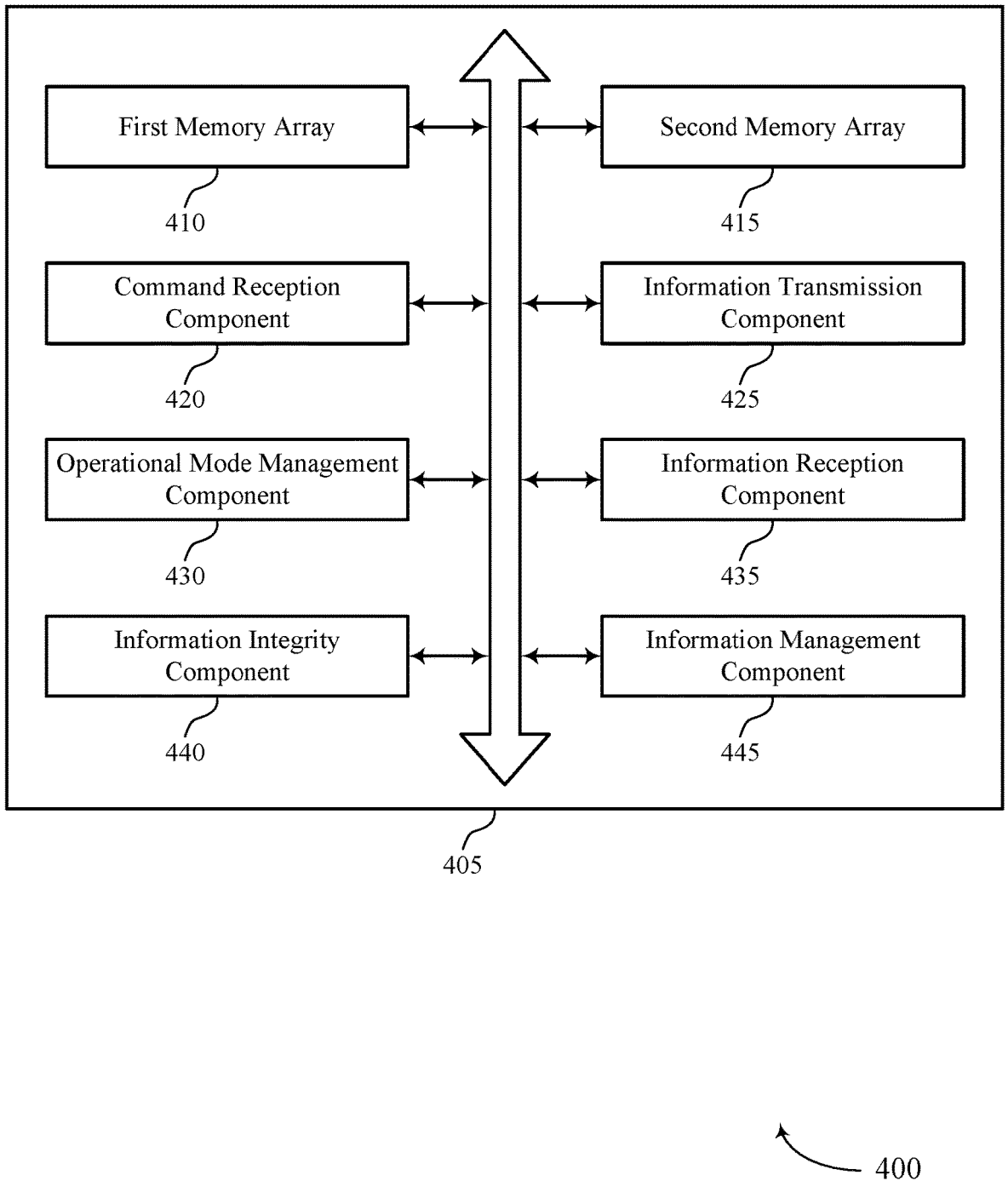
FIG. 4 shows a block diagram of a memory system that supports transferring memory system data to a host system in accordance with aspects of the present disclosure.

FIG. 4 shows a block diagram 400 of a memory system 405 that supports transferring memory system data to a host system in accordance with examples as disclosed herein. The memory system 405 may be an example of aspects of a memory system as described with reference to FIGS. 1 through 3. The memory system 405 may include a first memory array 410, a second memory array 415, a command reception component 420, an information transmission component 425, an operational mode management component 430, an information reception component 435, an information integrity component 440, and an information management component 445. Each of these modules may communicate, directly or indirectly, with one another (e.g., via one or more buses).

The first memory array 410 may refer to a memory array associated with a first degree of volatility, and the second memory array 415 may refer to a memory array associated with a second degree of volatility that is greater than the first degree of volatility. In some examples, the first memory array 410 and the second memory array 415 may refer to memory arrays of the memory system 405 that are associated with different storage architectures (e.g., different types of memory cells, different information storage techniques). In some examples, the first memory array 410 may be an example of a memory array of a memory device 130 described with reference to FIG. 1 (e.g., of a die 160). In some examples, the second memory array 415 may be an example of a memory array of a local memory 120 (e.g., of a memory system controller 115, of or otherwise accessible by an ASIC or other processing component of the memory system 405). In some examples, the first memory array 410 may include a set of NAND memory cells. In some examples, the second memory array 415 may include a set of SRAM cells.

The command reception component 420 may be configured to receive commands (e.g., from a host system). In some examples, the command reception component 420 may receive a command associated with entering a reduced power mode. In some examples, the command reception component 420 may receive a command associated with exiting the reduced power mode.

The information transmission component 425 may transmit (e.g., based on receiving a command associated with entering the reduced power mode) information stored in the second memory array 415 to a host system. In some examples, the information transmitted to the host system (e.g., stored in the second memory array 415) may be associated with a processing capability of the memory system 405 (e.g., operation of a memory system controller 115, associated with an ASIC of the memory system 405). In some examples, information transmitted by the information transmission component 425 to the host system (e.g., stored in the second memory array 415) may include TCM information, IPC information, redundant array information, cache information, a firmware mapping table, or various combination thereof.

The operational mode management component 430 may be configured to manage various operational modes of the memory system 405, including transitions between such operational modes. In some examples, the operational mode management component 430 may be configured to support the memory system 405 entering a reduced power mode after transmitting information to the host system (e.g., information stored in the second memory array 415). In some examples, the operational mode management component 430 may be configured to support the memory system 405 exiting the reduced power mode. In some examples, exiting a reduced power mode may be based on the command reception component 420 receiving a command associated with exiting the reduced power mode. In some examples, to enter a reduced power mode, the operational mode management component 430 may be configured to support the memory system 405 entering a power mode that reduces a power consumption associated with operating the second memory array 415.

The information reception component 435 may be configured to receive (e.g., based on exiting a reduced power mode) information, including information previously transmitted (e.g., to a host device, by the information transmission component 425). In some examples, information received by the information reception component 435 may be stored at (e.g., returned to) the second memory array 415.

In some examples, information integrity component 440 may be configured to perform an encryption operation or a scrambling operation on information before transmitting information (e.g., information that was stored in the second memory array 415). In some examples, the information integrity component 440 may be configured to perform a decryption or descrambling operation on received information (e.g., information received by the information reception component 435).

In some examples, the information management component 445 may be configured to maintain information in the second memory array 415 (e.g., information different than information transmitted by the information transmission component 425, additional information associated with the processing capability of the memory system 405) during operation of the memory system 405, including operation in a reduced power mode.

Figure 5:
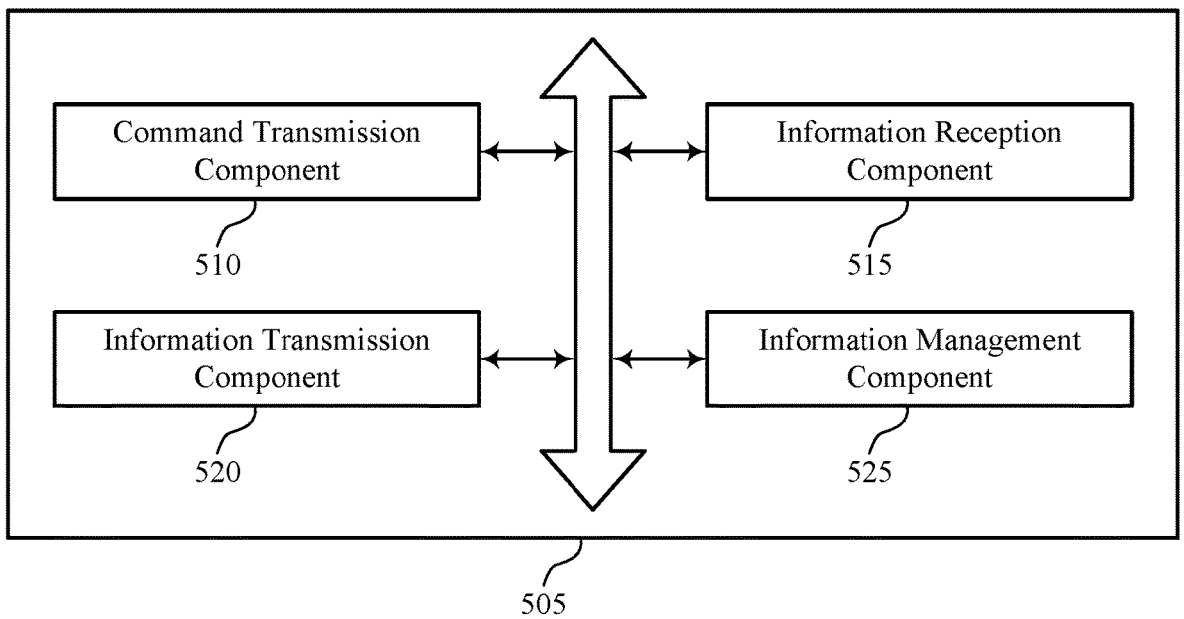
FIG. 5 shows a block diagram of a host system that supports transferring memory system data to a host system in accordance with aspects of the present disclosure.

FIG. 5 shows a block diagram 500 of a host system 505 that supports transferring memory system data to a host system in accordance with examples as disclosed herein. The host system 505 may be an example of aspects of a host system as described with reference to FIGS. 1 through 3. The host system 505 may include a command transmission component 510, an information reception component 515, an information transmission component 520, and an information management component 525. Each of these modules may communicate, directly or indirectly, with one another (e.g., via one or more buses).

The command transmission component 510 may be configured to transmit commands, such as commands to one or more memory systems 110. In some examples, the command transmission component 510 may be configured to transmit, to a memory system, a command associated with the memory system entering a reduced power mode. In some examples, the command transmission component 510 may be configured to transmit, to a memory system, a command associated with the memory system exiting a reduced power mode.

The information reception component 515 may be configured to receive information from a memory system (e.g., information stored at the memory system), such as information associated with a processing capability of the memory system. In some examples, the information reception component 515 may receive such information based on transmitting a command associated with the memory system entering a reduced power mode. In some examples, information received by the information reception component 515 may include TCM information, IPC information, redundant array information, cache information, a firmware mapping table, or a combination thereof.

The information transmission component 520 may be configured to transmit (e.g., to the memory system) the information received from the memory system, which may be based on determining to command the memory system to exit the reduced power mode.

In some examples, the information management component 525 may be configured to store information received from a memory system in a non-volatile memory array separate from the memory system (e.g., a non-volatile memory array of or otherwise accessible to the host system 505). In some examples, the information management component 525 may be configured to store information received from a memory system in a volatile memory array separate from the memory system (e.g., a non-volatile memory array of or otherwise accessible to the host system 505, a DRAM array of or accessible by the host system 505).

Figure 6:
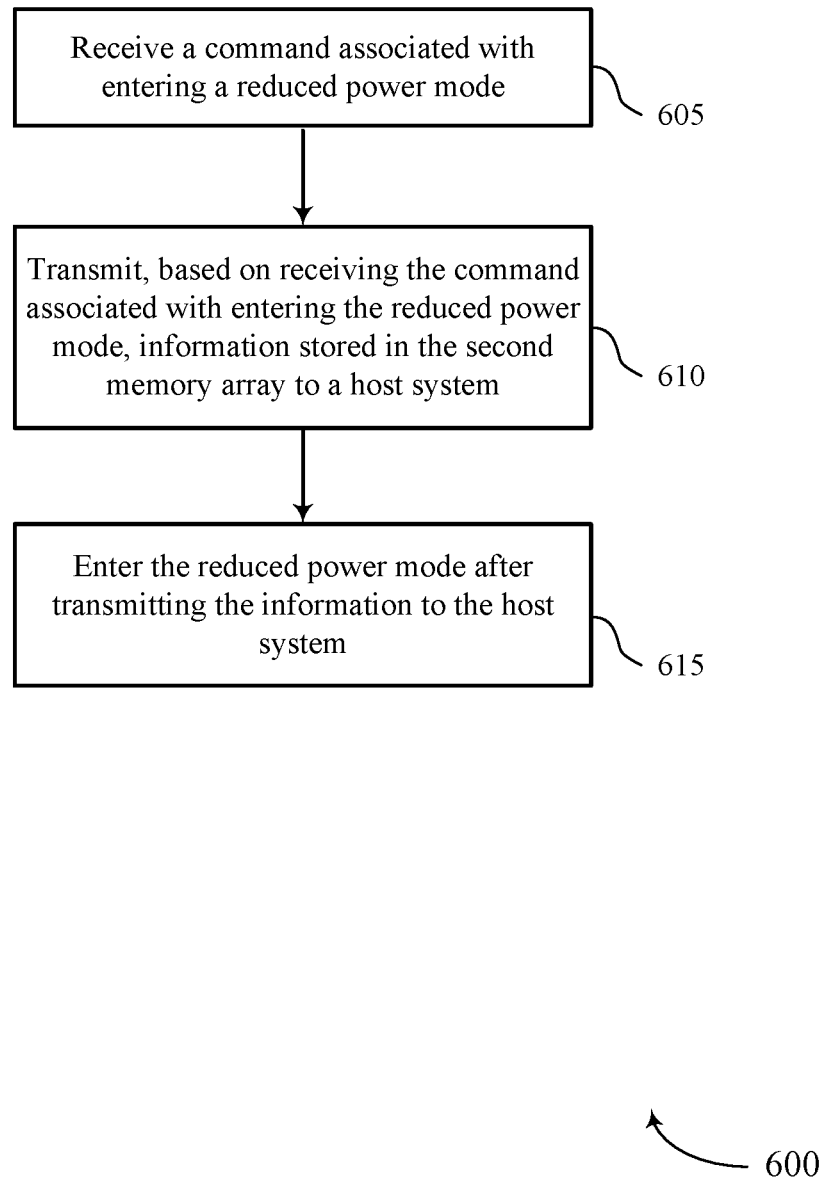
FIGS. 6 and 7 show flowcharts illustrating a method or methods that support transferring memory system data to a host system in accordance with examples as disclosed herein.

FIG. 6 shows a flowchart illustrating a method or methods 600 that supports transferring memory system data to a host system in accordance with aspects of the present disclosure. The operations of method 600 may be implemented by a memory system or its components as described herein. For example, the operations of method 600 may be performed by a memory system 110 as described with reference to FIGS. 1 through 4. Such a memory system 110 may include a first memory array (e.g., associated with a first degree of volatility) and a second memory array (e.g., associated with a second degree of volatility that is greater than the first degree of volatility). In some examples, a memory system 110 may perform aspects of the described functions using special-purpose hardware, such as an ASIC or CPU of the memory system 110. For example, aspects of the method 600 may be implemented by a controller (e.g., a memory system controller 115), among other components. Additionally or alternatively, aspects of the method 600 may be implemented as instructions stored in memory (e.g., firmware stored in a local memory 120). For example, the instructions, when executed by a controller (e.g., a memory system controller 115), may cause the memory system 110 to perform the operations of the method 600.

At 605, the method 600 may include receiving a command associated with entering a reduced power mode. The operations of 605 may be performed according to the methods described herein. In some examples, aspects of the operations of 605 may be performed by a command reception component as described with reference to FIG. 4.

At 610, the method 600 may include transmitting, based on receiving the command associated with entering the reduced power mode, information stored in the second memory array to a host system. The operations of 610 may be performed according to the methods described herein. In some examples, aspects of the operations of 610 may be performed by an information transmission component as described with reference to FIG. 4.

At 615, the method 600 may include entering the reduced power mode after transmitting the information to the host system. The operations of 615 may be performed according to the methods described herein. In some examples, aspects of the operations of 615 may be performed by an operational mode management component as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor) for receiving, at a memory system having a first memory array associated with a first degree of volatility and having a second memory array associated with a second degree of volatility that is greater than the first degree of volatility, a command associated with entering a reduced power mode, transmitting, based on receiving the command associated with entering the reduced power mode, information stored in the second memory array to a host system, and entering the reduced power mode after transmitting the information to the host system.

Some examples of the method 600 and the apparatus described herein may further include operations, features, circuitry, logic, means, or instructions for exiting the reduced power mode, and receiving, based on exiting the reduced power mode, the information transmitted to the host system.

Some examples of the method 600 and the apparatus described herein may further include operations, features, circuitry, logic, means, or instructions for receiving, at the memory system, a command associated with exiting the reduced power mode, and exiting the reduced power mode may be based on receiving the command associated with exiting the reduced power mode.

Some examples of the method 600 and the apparatus described herein may further include operations, features, circuitry, logic, means, or instructions for performing an encryption operation or a scrambling operation on the information before transmitting the information, and performing a decryption or descrambling operation on the received information.

In some examples of the method 600 and the apparatus described herein, the information transmitted to the host system may be associated with a processing capability of the memory system.

In some examples of the method 600 and the apparatus described herein, the information transmitted to the host system may include TCM information, IPC information, redundant array information, cache information, a firmware mapping table, or any combination thereof.

Some examples of the method 600 and the apparatus described herein may further include operations, features, circuitry, logic, means, or instructions for maintaining, at the second memory array and during operation in the reduced power mode, second information stored in the second memory array.

In some examples of the method 600 and the apparatus described herein, entering the reduced power mode may include operations, features, circuitry, logic, means, or instructions for entering a power mode that reduces a power consumption associated with operating the second memory array.

In some examples of the method 600 and the apparatus described herein, the first memory array may include a set of NAND memory cells, and the second memory array may include a set of SRAM cells.

Figure 7:
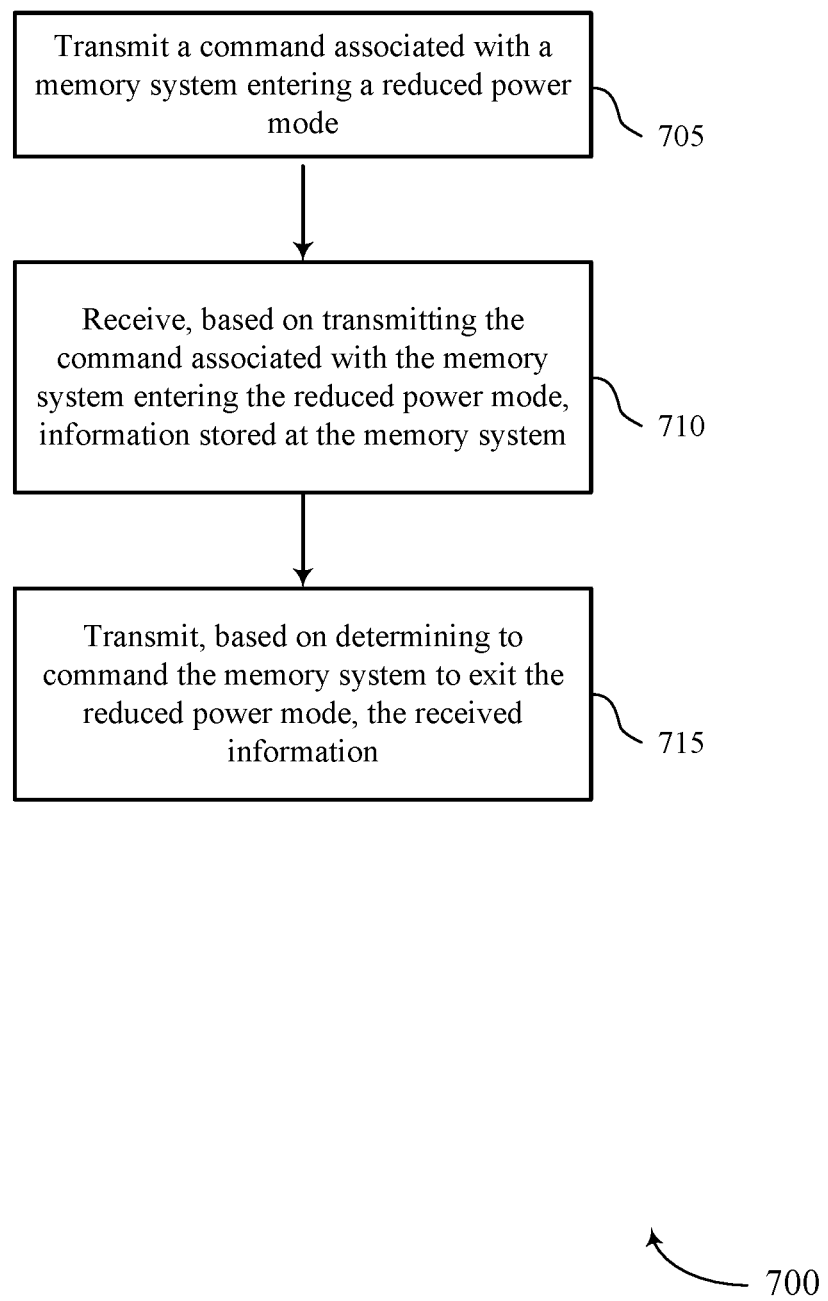

FIG. 7 shows a flowchart illustrating a method or methods 700 that supports transferring memory system data to a host system in accordance with aspects of the present disclosure. The operations of method 700 may be implemented by a host system or its components as described herein. For example, the operations of method 700 may be performed by a host system as described with reference to FIGS. 1 through 3 and 5. In some examples, a host system 105 may perform aspects of the described functions using special-purpose hardware, such as an ASIC or CPU of the host system 105. For example, aspects of the method 700 may be implemented by a controller (e.g., a host system controller 106), among other components. Additionally or alternatively, aspects of the method 700 may be implemented as instructions stored in memory (e.g., firmware stored in a host memory 107). For example, the instructions, when executed by a controller (e.g., a host system controller 106), may cause the host system 105 to perform the operations of the method 700.

At 705, the method 700 may include transmitting (e.g., to a memory system) a command associated with a memory system entering a reduced power mode. The operations of 705 may be performed according to the methods described herein. In some examples, aspects of the operations of 705 may be performed by a command transmission component as described with reference to FIG. 5.

At 710, the method 700 may include receiving (e.g., from the memory system), based on transmitting the command associated with the memory system entering the reduced power mode, information stored at the memory system. The operations of 710 may be performed according to the methods described herein. In some examples, aspects of the operations of 710 may be performed by an information reception component as described with reference to FIG. 5.

At 715, the host system may transmit (e.g., to the memory system), based on determining to command the memory system to exit the reduced power mode, the received information (e.g., information received from the memory system). The operations of 715 may be performed according to the methods described herein. In some examples, aspects of the operations of 715 may be performed by an information transmission component as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor) for transmitting, to a memory system, a command associated with the memory system entering a reduced power mode, receiving, from the memory system and based on transmitting the command associated with the memory system entering the reduced power mode, information stored at the memory system, and transmitting, to the memory system based on determining to command the memory system to exit the reduced power mode, the information received from the memory system.

Some examples of the method 700 and the apparatus described herein may further include operations, features, circuitry, logic, means, or instructions for storing the information received from the memory system in a non-volatile memory array separate from the memory system. Some examples of the method 700 and the apparatus described herein may further include operations, features, circuitry, logic, means, or instructions for storing the information received from the memory system in a volatile memory array separate from the memory system.

In some examples of the method 700 and the apparatus described herein, the information received from the memory system may be associated with a processing capability of the memory system.

In some examples of the method 700 and the apparatus described herein, the information received from the memory system includes TCM information, IPC information, redundant array information, cache information, a firmware mapping table, or a combination thereof.

It should be noted that the methods described above describe possible implementations, and that the operations and the steps may be rearranged or otherwise modified and that other implementations are possible. Further, portions from two or more of the methods may be combined.

An apparatus is described. The apparatus may include a first memory array associated with a first degree of volatility, a second memory array associated with a second degree of volatility that is greater than the first degree of volatility, an interface configured to couple the apparatus with a host system, and a controller or control component coupled with the first memory array, the second memory array, and the interface. In some examples, the controller or control component may be configured to cause the apparatus to receive a command from the host system associated with entering a reduced power mode, transmit, over the interface and based on the command associated with entering the reduced power mode, information stored in the second memory array to the host system, and enter the reduced power mode after transmitting the information to the host system.

In some examples of the apparatus, the controller or control component may be further configured to exit the reduced power mode, and receive, over the interface and based on exiting the reduced power mode, the information transmitted to the host system.

In some examples of the apparatus, the controller or control component may be further configured to receive a command from the host system associated with exiting the reduced power mode, and exit the reduced power mode based on receiving the command associated with exiting the reduced power mode.

In some examples of the apparatus, the controller or control component may be further configured to perform an encryption operation or a scrambling operation on the information before transmitting the information, and perform a decryption or descrambling operation on the received information.

In some examples, the information transmitted to the host system may be associated with a processing capability of the apparatus. In some examples, the information transmitted to the host system may include TCM information, IPC information, redundant array information, cache information, a firmware mapping table, or a combination thereof.

In some examples of the apparatus, the controller or control component may be further configured to maintain, at the second memory array and during operation in the reduced power mode, second information stored in the second memory array.

In some examples of the apparatus, to enter the reduced power mode, the controller or control component may be configured to enter a power mode that reduces a power consumption associated with operating the second memory array.

In some examples, the first memory array includes a set of NAND memory cells, and the second memory array includes a set of SRAM cells.

An apparatus is described. The apparatus may include a controller or control component configured to be coupled with a memory system. In some examples, the controller or control component may be configured to cause the apparatus to transmit, to the memory system, a command associated with the memory system entering a reduced power mode, receive, from the memory system and based on transmitting the command associated with the memory system entering the reduced power mode, information stored at the memory system, and transmit, to the memory system based on determining to command the memory system to exit the reduced power mode, the information received from the memory system.

Some examples of the apparatus may include a non-volatile memory array, and the controller or control component may be configured to store the information received from the memory system in the non-volatile memory array.

In some examples, the information received from the memory system may be associated with a processing capability of the memory system. In some examples, the information received from the memory system includes TCM information, IPC information, redundant array information, cache information, a firmware mapping table, or a combination thereof.

A non-transitory computer-readable medium is described. The non-transitory computer-readable medium may store code including instructions which, when executed by a processor of an electronic device, cause the electronic device to receive, at a memory system having a first memory array associated with a first degree of volatility and having a second memory array associated with a second degree of volatility that is greater than the first degree of volatility, a command associated with entering a reduced power mode, transmit, based at least in part on receiving the command associated with entering the reduced power mode, information stored in the second memory array to a host system, and enter the reduced power mode after transmitting the information to the host system.

In some examples of the non-transitory computer-readable medium, the instructions, when executed by the processor of the electronic device, may further cause the electronic device to exit the reduced power mode, and receive, based at least in part on exiting the reduced power mode, the information transmitted to the host system.

In some examples of the non-transitory computer-readable medium, the instructions, when executed by the processor of the electronic device, may further cause the electronic device to receive, at the memory system, a command associated with exiting the reduced power mode, and exit the reduced power mode based at least in part on receiving the command associated with exiting the reduced power mode.

In some examples of the non-transitory computer-readable medium, the instructions, when executed by the processor of the electronic device, may further cause the electronic device to perform an encryption operation or a scrambling operation on the information before transmitting the information, and perform a decryption or descrambling operation on the received information.

In some examples of the non-transitory computer-readable medium, the information transmitted to the host system may be associated with a processing capability of the memory system. In some examples, the information transmitted to the host system may include TCM information, IPC information, redundant array information, cache information, a firmware mapping table, or any combination thereof.

In some examples of the non-transitory computer-readable medium, the instructions, when executed by the processor of the electronic device, may further cause the electronic device to maintain, at the second memory array and during operation in the reduced power mode, second information stored in the second memory array.

In some examples of the non-transitory computer-readable medium, the instructions to enter the reduced power mode, when executed by the processor of the electronic device, may cause the electronic device to enter a power mode that reduces a power consumption associated with operating the second memory array.

Another non-transitory computer-readable medium is described. The non-transitory computer-readable medium may store code including instructions which, when executed by a processor of an electronic device, cause the electronic device to transmit, to a memory system, a command associated with the memory system entering a reduced power mode, receive, from the memory system and based at least in part on transmitting the command associated with the memory system entering the reduced power mode, information stored at the memory system, and transmit, to the memory system based at least in part on determining to command the memory system to exit the reduced power mode, the information received from the memory system.

In some examples of the non-transitory computer-readable medium, the instructions, when executed by the processor of the electronic device, may further cause the electronic device to store the information received from the memory system in a non-volatile memory array separate from the memory system.

In some examples of the non-transitory computer-readable medium, the information received from the memory system may be associated with a processing capability of the memory system. In some examples, the information received from the memory system may include TCM information, IPC information, redundant array information, cache information, a firmware mapping table, or a combination thereof.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a first memory array associated with a first degree of volatility,
a second memory array associated with a second degree of volatility that is greater than the first degree of volatility,
an interface configured to couple the apparatus with a host system, and
a controller coupled with the first memory array, the second memory array, and the interface, wherein the controller is configured to cause the apparatus to:
receive a command from the host system associated with entering a reduced power mode;
transmit, via the interface and based at least in part on the command associated with entering the reduced power mode, information associated with a processing capability of the apparatus and stored in the second memory array to the host system, wherein the information comprises tightly-coupled memory (TCM) information, inter-process communication (IPC) information, redundant array information, a firmware mapping table, or a combination thereof;
enter the reduced power mode after transmitting the information to the host system;
exit the reduced power mode; and
receive, via the interface and based at least in part on exiting the reduced power mode, the information.

2. The apparatus of claim 1, wherein the controller is further configured to cause the apparatus to:
receive a command from the host system associated with exiting the reduced power mode; and
exit the reduced power mode based at least in part on receiving the command associated with exiting the reduced power mode.

3. The apparatus of claim 1, wherein the controller is further configured to cause the apparatus to:
perform an encryption operation or a scrambling operation on the information before transmitting the information; and
perform a decryption or descrambling operation on the received information.

4. The apparatus of claim 1, wherein the controller is further configured to cause the apparatus to:
maintain, at the second memory array and during operation in the reduced power mode, second information stored in the second memory array.

5. The apparatus of claim 1, wherein, to enter the reduced power mode, the controller is configured to cause the apparatus to:
enter a power mode that reduces a power consumption associated with operating the second memory array.

6. The apparatus of claim 1, wherein:
the first memory array comprises a plurality of NAND memory cells; and
the second memory array comprises a plurality of static random access memory (SRAM) cells.

7. The apparatus of claim 1, wherein the controller is further configured to cause the apparatus to:
determine an amount of data to be transmitted between the host system and the controller, wherein entering the reduced power mode after transmitting the information to the host system is based at least in part on the determining the amount of data transmitted between the host system and the controller.

8. The apparatus of claim 1, wherein the controller is further configured to cause the apparatus to:
start a timer based at least in part on receiving the command from the host system, wherein the entering the reduced power mode after transmitting the information to the host system is based at least in part on the timer reaching a threshold value.

9. An apparatus, comprising:
a controller configured to be coupled with a memory system, wherein the controller is configured to cause the apparatus to:
transmit, to the memory system, a command associated with the memory system entering a reduced power mode;
receive, from the memory system and based at least in part on transmitting the command associated with the memory system entering the reduced power mode, information associated with a processing capability of the memory system and stored at the memory system, wherein the information comprises tightly-coupled memory (TCM) information, inter-process communication (IPC) information, redundant array information, a firmware mapping table, or a combination thereof;
store the information received from the memory system in a non-volatile memory array separate from the memory system; and
transmit, to the memory system based at least in part on determining to command the memory system to exit the reduced power mode, the information received from the memory system.

10. A non-transitory computer-readable medium storing code comprising instructions which, when executed by a processor of an electronic device, cause the electronic device to:
receive, at a memory system having a first memory array associated with a first degree of volatility and having a second memory array associated with a second degree of volatility that is greater than the first degree of volatility, a command associated with entering a reduced power mode;
transmit, based at least in part on receiving the command associated with entering the reduced power mode, information associated with a processing capability of the memory system and stored in the second memory array to a host system, wherein the information comprises tightly-coupled memory (TCM) information, inter-process communication (IPC) information, redundant array information, a firmware mapping table, or a combination thereof;
enter the reduced power mode after transmitting the information to the host system;
exit the reduced power mode; and
receive, based at least in part on exiting the reduced power mode, the information.

11. The non-transitory computer-readable medium of claim 10, wherein the instructions, when executed by the processor of the electronic device, further cause the electronic device to:

receive, at the memory system, a command associated with exiting the reduced power mode, wherein exiting the reduced power mode is based at least in part on receiving the command associated with exiting the reduced power mode.

12. The non-transitory computer-readable medium of claim 10, wherein the instructions, when executed by the processor of the electronic device, further cause the electronic device to:

perform an encryption operation or a scrambling operation on the information before transmitting the information; and perform a decryption or descrambling operation on the received information.

13. The non-transitory computer-readable medium of claim 10, wherein the instructions, when executed by the processor of the electronic device, further cause the electronic device to:

maintain, at the second memory array and during operation in the reduced power mode, second information stored in the second memory array.

14. The non-transitory computer-readable medium of claim 10, wherein the instructions to enter the reduced power mode, when executed by the processor of the electronic device, cause the electronic device to:

enter a power mode that reduces a power consumption associated with operating the second memory array.

15. A non-transitory computer-readable medium storing code comprising instructions which, when executed by a processor of an electronic device, cause the electronic device to:

transmit, to a memory system, a command associated with the memory system entering a reduced power mode;

receive, from the memory system and based at least in part on transmitting the command associated with the memory system entering the reduced power mode, information associated with a processing capability of the memory system and stored at the memory system, wherein the information comprises tightly-coupled memory (TCM) information, inter-process communication (IPC) information, redundant array information, a firmware mapping table, or a combination thereof;

store the information received from the memory system in a non-volatile memory array separate from the memory system; and transmit, to the memory system based at least in part on determining to command the memory system to exit the reduced power mode, the information received from the memory system.

* * * * *